May 9, 1967 P. A. MANOR 3,318,569
PLUG VALVE ASSEMBLY AND METHOD OF MAKING
Filed May 8, 1964 3 Sheets-Sheet 1

INVENTOR
Paul A. Manor

BY *Strauch, Nolan & Neale*
ATTORNEYS

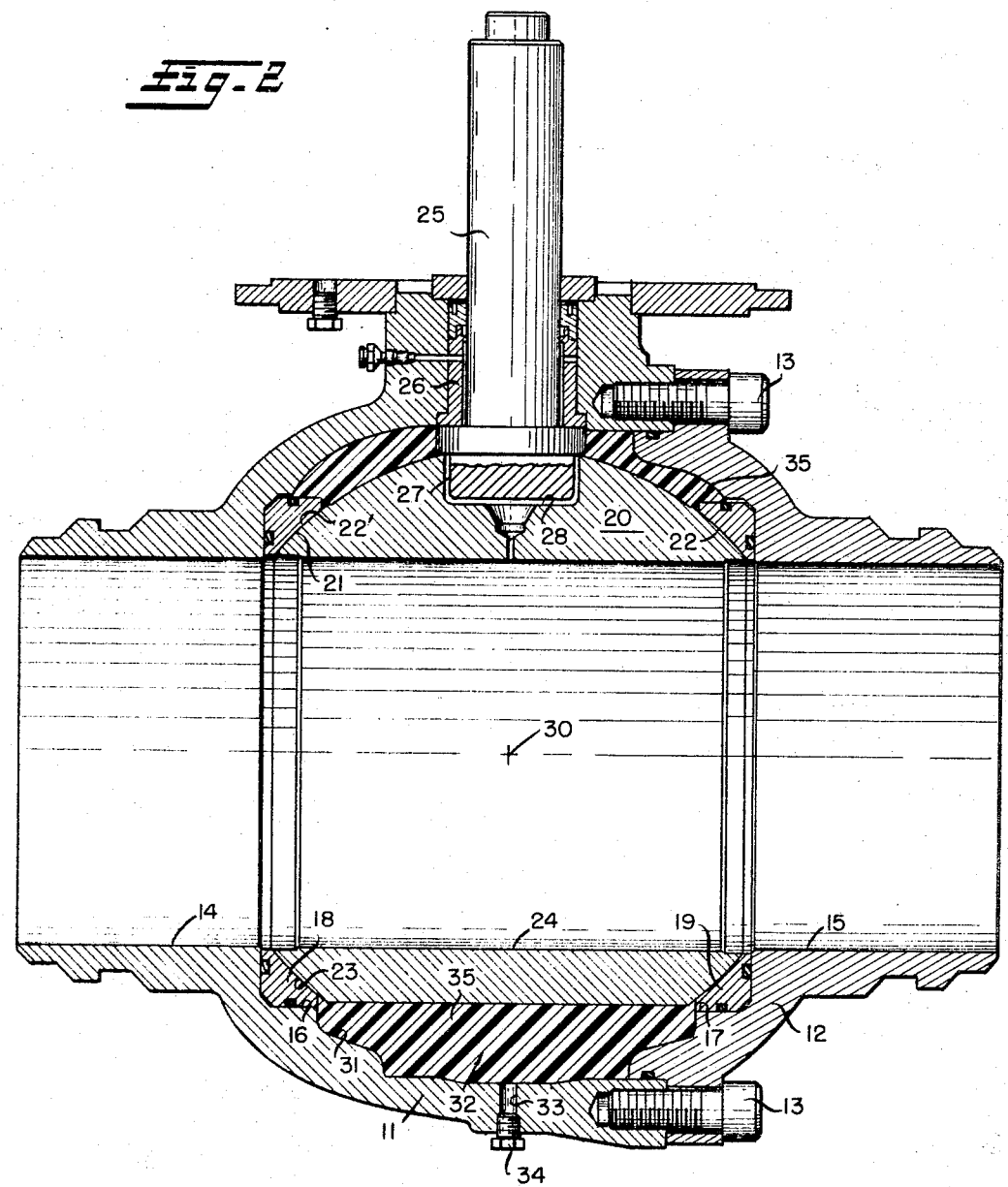

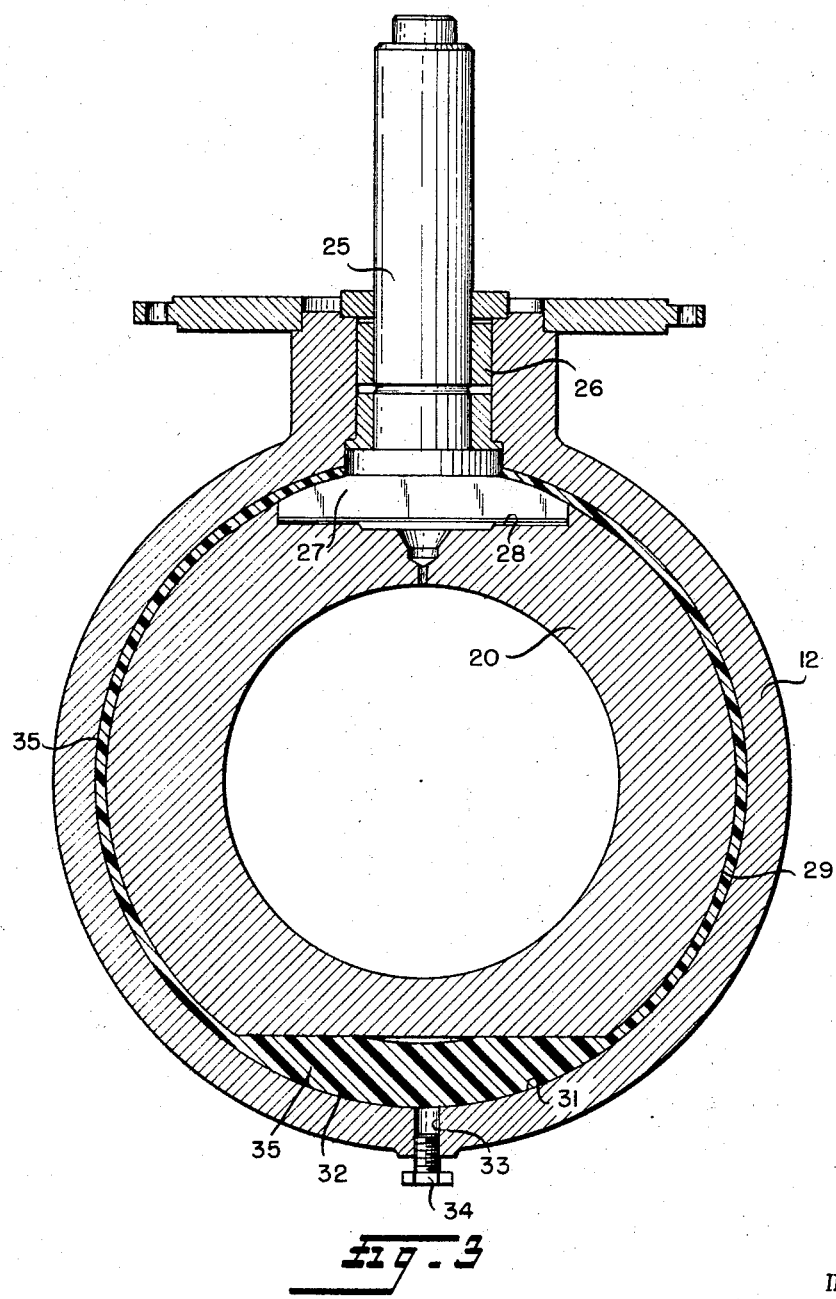

United States Patent Office 3,318,569
Patented May 9, 1967

3,318,569
PLUG VALVE ASSEMBLY AND METHOD
OF MAKING
Paul A. Manor, Pittsburgh, Pa., assignor to Rockwell
Manufacturing Company, Pittsburgh, Pa., a corporation of Pennsylvania
Filed May 8, 1964, Ser. No. 365,997
11 Claims. (Cl. 251—315)

This invention relates to rotary plug valve assemblies and methods of construction and particularly to such valves wherein interior space of the body surrounding the plug is substantially occupied by an inert material that does not interfere with normal valve operation.

According to the preferred mode of practicing the invention the valve body and plug are assembled mechanically in the usual manner and fluent filler material is introduced into the body space around the plug to set in situ.

It is, therefore, the primary object of the invention to provide a plug valve assembly having a rotary plug seated within a body space characterized in that the internal body space around the plug is occupied by a filler material that is inert with respect to the line fluid. An ancillary object is the novel method of making this assembly wherein the filler material in fluent form is introduced into said space and allowed to set to solid form, preferably under ambient conditions of temperature and pressure.

A further object of the invention is to provide a novel rotary plug valve assembly wherein internal body space around the plug is occupied by a mass of material that is inert with respect to the line fluid. This material is preferably initially fluent for introduction into the body and hardenable in situ. It should remain hard at ambient and valve operating temperatures. Various specific materials found satisfactory will be described, but the invention is broad enough in scope to include any suitable material.

Further and more specific objects of the invention will appear as the description proceeds in connection with the appended claims and the annexed drawings wherein:

FIGURE 2 is an axial section through the valve assembly of FIGURE 1; and

FIGURE 3 is a section at right angles to the flow axis of the valve assembly of FIGURE 1.

Figure 1:
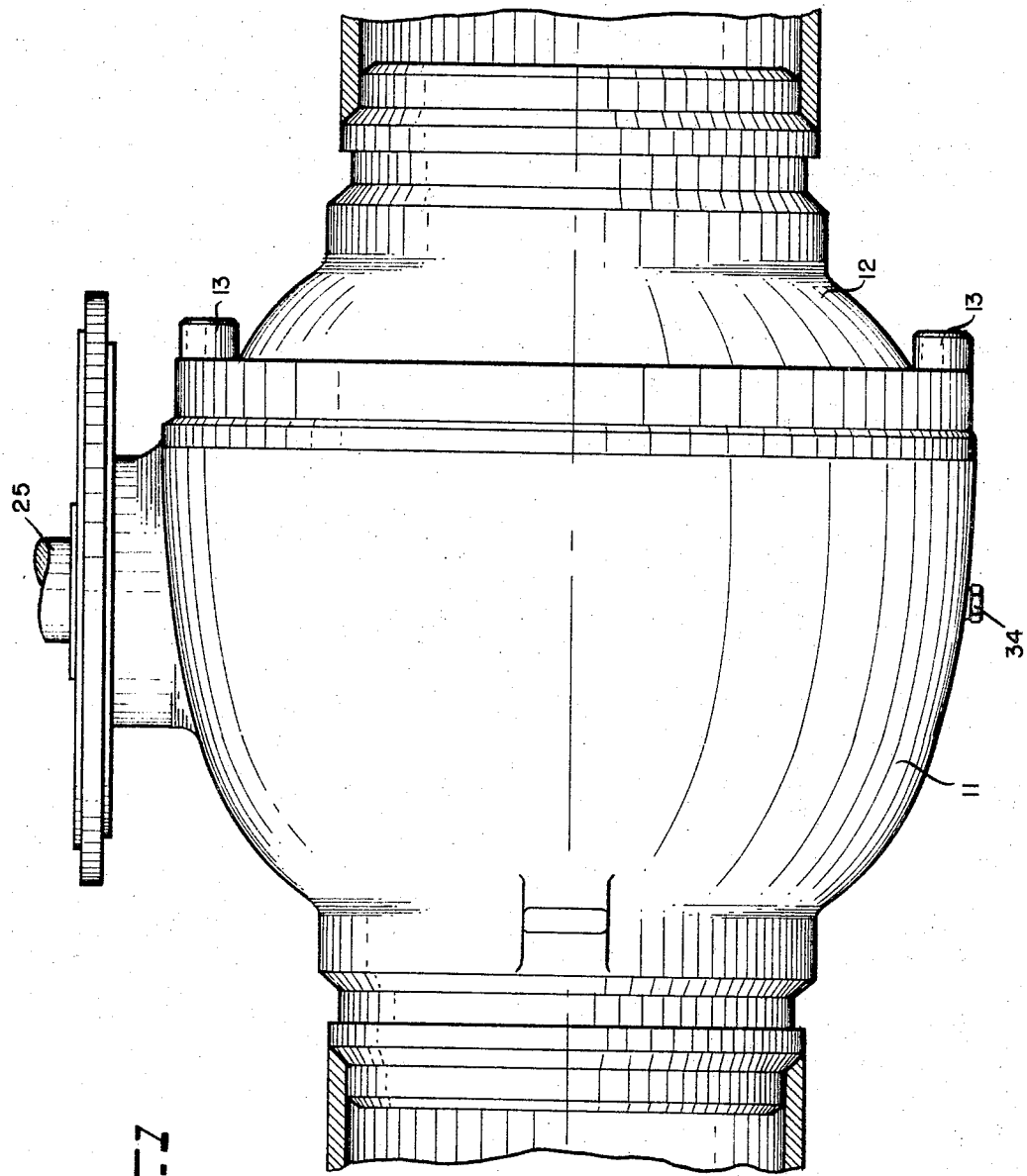
FIGURE 1 is a side elevation of a plug valve assembly according to one embodiment of the invention.

The valve assembly comprises a body made up of a main portion 11 having an open end over which is secured a tailpiece portion 12 as by bolts 13. Fluid flow passages 14 and 15 of the same size are provided in axial alignment in the body portions.

At the inner ends of passages 14 and 15 the body wall is recessed to provide shoulders 16 and 17, respectively, for mounting plug seating rings 18 and 19, respectively. Rings 18 and 19 are spherically surfaced at 21 and 22, respectively, for seating a ball type plug 20 having spherical surface zones at 22 and 23. The plug is thereby supported solely in spherical seating surface contact with the seat rings.

A through port 24 of the same diameter as passages 14 and 15 is provided in plug 20. In the open position of the valve, this port 24 is aligned with passages 14 and 15. A valve stem 25 rotatably extends through a suitable bushing arrangement at 26 into the valve body to terminate in a tang 27 that interfits with a slot 28 in the upper end of plug 20, so that rotation of stem 25 through 90° will dispose port 24 out of alignment with passages 14 and 15 and the spherical surface 29 blocks fluid flow through the valve.

The axis of rotation of valve stem 25 substantially contains the center 30 of the spherical plug seating surfaces which also lies on the flow axis through the valve.

The foregoing is more or less known ball valve construction at this date whether the plug seats on spherical surfaces that are on separate rings as shown or integral with the body. In the known structures, the interior body wall indicated at 31 defines and encloses a chamber or space 32 which is of greater volume than the plug. Difficulties have been encountered in certain valve usages caused by the accumulation of sediment, dirt, small particles and other undesirable solid foreign material in this space. For example, foreign material deposited in the space from one fluid may chemically react with another fluid. Also, this material build-up may bind the plug against rotation and sharp particles may enter and score the valve seats.

In the present invention this problem is solved by providing a suitable filler material occupying that space without interfering with valve operation.

In actual practice it is preferred to assemble the valve as usual and rotate the plug to the valve open position of FIGURE 2. Under this condition the space 32 is entirely enclosed between the surface of plug 20 and the inner body wall 31. An access hole to space 32 is provided. This may be the usual drain hole 33 closed by removable closure 34 of the conventional structure, or it may be a separate opening.

Through this opening 33 the filler material in fluent condition is pumped or otherwise forced until it occupies the entire volume of chamber 32 around the plug. This material is allowed to set or become solid in situ and when so set it occupies the space 32 as a solid volumetric filler 35 which does not permit the entry or accumulation of foreign material in space 32.

The filler material may be any pourable material which initially is either liquid or capable of liquid suspension. It must be relatively inert with respect to the line fluid being handled, and it is preferably of low density so as to add little or no appreciable weight to the assembly. It preferably solidifiies or hardens in the space 32 at ambient temperature although some materials may be set by heat, but in any event once set it must remain solid at both ambient and valve operating temperatures, even where hot fluids are being handled in the line.

The material is preferably of very low coefficient of friction so as not to impede rotation of the plug on its seat, and the shrinkage or expansion coefficients during setting should be low so as to retain good operational fit with the valve plug surface.

The filler material presently preferred is a plastic that exists initially in liquid form and sets by chemical action in situ. For example, the liquid may be an epoxy resin or polyurethane, and it is pumped into the space 32 to effectively fill it and allowed to set to solid form. Actually this setting action is chemical and produces a product which expands into all the space and is more or less bonded upon body wall 31. Where polyurethane is used a foamed solid product emerges as the filler. Prior to introduction of the liquid filler the exposed surfaces of plug 20 and the valve stem are coated with a parting compound such as a light hydrocarbon oil to prevent the filler from attaching to it. Also, during the time the filler is setting in situ it may be preferable to slightly rock the plug about its axis. This helps to establish a surface demarcation between the plug and filler, and it insures against filler material projections locking into surface depressions such as lubricant grooves in the plug where the plug is of the lubricated type shown in Scherer Patent No. 2,788,015.

Alternatively, a thermosetting plastic such as a phenolic condensation compound, for example Bakelite, may be used as the filler.

Also, the filler may be a thermoplastic material such as a vinyl resin, polyethylene, nylon or polytetrafluoroethylene (Teflon) in initial flowable form.

In any event, whatever the filler material, it is introduced in fluent condition, is rendered permanently solid in situ, and it occupies the valve body space around the plug in non-binding relation to the plug. After the filler has hardened the plug may safely be rotated between its 90° apart operational positions. Other materials than those above specified may be used as fillers without departing from the spirit of the invention herein.

While the invention is disclosed as applied to a ball type plug valve it is equally applicable to other rotatable plug valves such as tapered and cylindrical plug valves.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a plug valve assembly having a body formed with fluid inlet and outlet passages opening at their inner ends into a valve plug cavity, means providing axially spaced apart valve plug seating surfaces positioned in said cavity respectively in surrounding relation to the inner ends of said passages, a ported ball type plug structure supported on said seating surfaces within said cavity for rotation between positions where it respectively blocks and provides fluid communication between said passages, and surface means on said plug structure and coacting with said seating surfaces to provide annular seals around the inner ends of said passages when said plug structure is rotated to its blocking position, said plug structure, said body, and said means providing said seating surfaces delimiting an internal space, the improvement comprising a solid filler substantially entirely occupying said space and having a running clearance with said plug structure, said filler being formed from a material which is different from the material forming the means providing said seating surfaces.

2. The plug valve assembly defined in claim 1, wherein said filler material is bonded to said body wall.

3. The plug valve assembly defined in claim 1, wherein said filler material is a relatively light weight plastic.

4. The plug valve assembly defined in claim 1, wherein said seating surfaces are formed from a material that is more rigid than said filler material.

5. The plug valve assembly defined in claim 1, wherein said means providing said seating surfaces comprises axially aligned, spaced apart seat rings delimiting said space to confine said filler material therein.

6. The plug valve defined in claim 5 wherein said filler material is plastic and wherein said seat rings are metallic.

7. In a method of making a ball valve structure wherein said valve structure is provided with a valve body formed with fluid inlet and outlet passages opening at their inner ends into a valve plug cavity, axially spaced apart valve plug seating surfaces positioned in said body within said cavity respectively in surrounding relation to the inner ends of said passages, and a ported ball type valve plug supported on said surfaces within said cavity and coacting with said body and said means providing said seating surfaces to define an internal space, and wherein said plug is rotatable between positions where it blocks and provides fluid communication between said passages and has surface means coacting with said seating surfaces when in flow blocking position to provide annular seals around the inner ends of said passages, said method comprising the steps of assembling said plug in said cavity in supported relation on said seating surfaces for rotation between said positions, thereafter introducing into said space in fluent condition a filler material to substantially occupy said space, and solidifying said introduced filler material in situ axially between said seating surfaces and in running clearance relation with said plug.

8. In the method defined in claim 7, the step of first coating the plug surface with a parting compound to prevent said filler material from sticking thereto.

9. The method defined in claim 7, wherein said filler material is a liquid plastic that solidifies in situ with little or no appreciable change in volume.

10. The method defined in claim 7 comprising the step of providing said seating surfaces on ring structures formed from material more rigid than said filler material in solidified form and positioned in said body to enclose said space in cooperation with said body and said plug.

11. The method defined in claim 7 comprising the step of turning said plug to its flow blocking position before introducing said filler material into said space, whereby said annular seals prevent leakage of fluent filler material into said passages.

References Cited by the Examiner

UNITED STATES PATENTS

| | | | |
|---|---|---|---|
| 413,216 | 10/1889 | Weber | 257—314 XR |
| 2,801,199 | 7/1957 | Meyers | 264—45 XR |
| 2,802,766 | 8/1957 | Leverenz | 269—45 |
| 3,041,036 | 6/1962 | McFarland | 251—317 XR |
| 3,093,864 | 6/1963 | Waldron et al. | |
| 3,167,300 | 1/1965 | Kaiser | 251—315 |

FOREIGN PATENTS 1,041,672 6/1953 France.

M. CARY NELSON, *Primary Examiner.*